March 4, 1969  J. H. COOPER  3,431,384
MEANS FOR CUTTING WIRE BY WIRE-MELTING ELECTRICAL PULSES
Filed Sept. 24, 1965
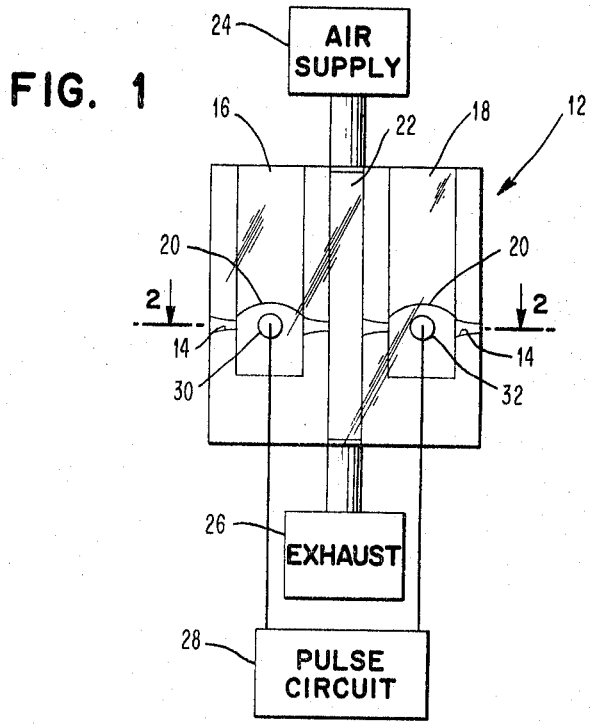
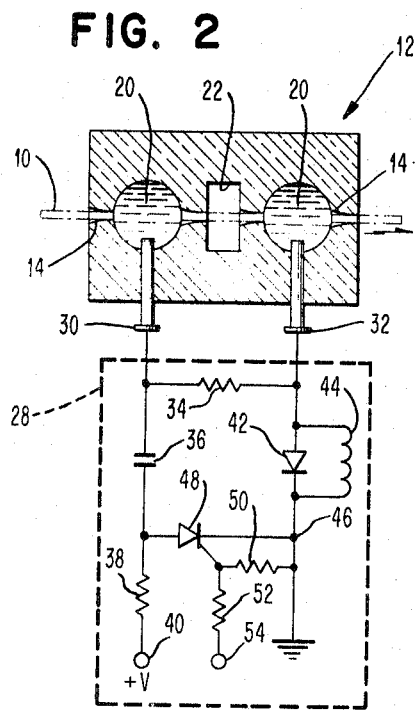
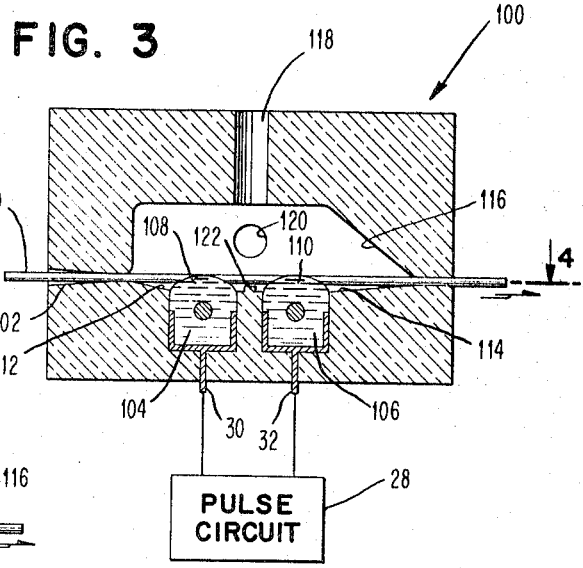
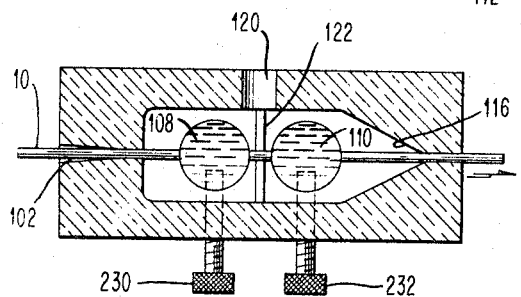
INVENTOR
JOHN H. COOPER
BY *Fred Fisher*
ATTORNEY

United States Patent Office 3,431,384
Patented Mar. 4, 1969

3,431,384
MEANS FOR CUTTING WIRE BY WIRE-MELTING ELECTRICAL PULSES
John H. Cooper, Lansdale, Pa., assignor to Sperry Rand Corporation, New York, N.Y., a corporation of Delaware
Filed Sept. 24, 1965, Ser. No. 490,041
U.S. Cl. 219—68      3 Claims
Int. Cl. B23p 1/00; B23k 11/24, 9/10

ABSTRACT OF THE DISCLOSURE

An apparatus for cutting wire memory elements on the order of 5 mils in diameter in which continuously moving wire is passed through spaced mercury-reservoir contacts. At intervals, carefully controlled pulses of current are applied to the wire bridging the contacts to nondestructively melt and thus sever the wire without arcing and without creating blobs at the ends of the elements.

---

This invention relates to a method and means for cutting wire, and, in particular, to a method and means for cutting Permalloy plated wire.

In the past, wire has been manually or automatically cut by mechanical means, such as shears, knives, saws, scissors, and the like. In order to automatically prepare fixed lengths of wire by methods of the prior art, it was necessary to orient a long strip of wire to a desired position, stop the wire, and re-orient the wire to the desired position again, stop the wire, cut, re-orient the wire to the desired position again, stop the wire, cut, re-orient, stop, cut, etc.

The necessity for prior art systems to repeatedly stop and re-orient is an inherent limitation on the speed of such systems. Rough edges, or burrs, on the cut ends of the wires often result from mechanically cutting the wire. Such disadvantages are obviated by following the teachings of this invention.

This invention is highly useful for automatically cutting lengths of plated wire. In particular, Mathias teaches a means for plating a film of nickel-iron alloy, having a circumferential easy magnetic axis of anisotropy, onto a small diameter beryllium copper wire while the wire is continuously in motion, in a copending patent application, Ser. No. 443,399, filed Mar. 29, 1965, and assigned to the assignee of this application. This invention is well suited for automatically cutting wire following a plating operation.

This invention enables automatic control of wire cutting by an electronic control system; the attainability of higher cutting speeds over devices of the prior art; and novel control of the cutting speed and the physical shape of the cut ends of the wire by electronically controlling the burning rate of the wire.

In accordance with a preferred embodiment of this invention, a nickel-iron plated beryllium copper wire is continuously moved along a linear path through a pair of mercury reservoir contacts. At fixed intervals, a pulse of current is longitudinally applied along a short length of the wire, at the contacts. The pulse is of sufficient magnitude to cause the wire to nondestructively melt, in a nonvaporizing manner, and thus sever.

Other objects and advantages of this invention, together with its construction and mode of operation, will become more apparent from the following description, when read in conjunction with the accompanying drawing, in which:

FIG. 1 is an elevational view, in schematic form, of an electronic cutter in accordance with one embodiment of this invention;

FIG. 2 is a cross sectional view taken along the lines 2—2 of FIG. 1, and illustrating, in greater detail, a pulse circuit useful in accordance with this invention;

FIG. 3 is a cross sectional side view of another embodiment of this invention; and FIG. 4 is a cross sectional top view of the embodiment shown in FIG. 3.

A beryllium copper wire 10, previously plated with a magnetic coating of iron and nickel is fed through an electronic wire cutter 12 which properly severs the wire 10 into desired segment lengths.

The wire 10 continuously moves toward the right-hand direction, as illustrated by the arrow in the drawing, being pushed from the left. The wire 10 is threaded through the contoured wire guides 14, passing therealong through a pair of mercury cup reservoirs 16 and 18. The mercury cup reservoirs 16 and 18 are partially filled with sufficient mercury 20 so as to provide proper contact to the plated wire 10.

The wire 10 passes through an orifice 22 between the two mercury cup reservoirs 16 and 18. An air supply source 24 is coupled to the orifice 22 through to a suitable exhaust 26 to dissipate exhaust gases, which may be mercury laden, and to dispose of small particles of matter.

A pulse circuit 28 applies a pulse of current across a pair of brass contacts 30 and 32 which are, respectively, coupled to the mercury 20 within the corresponding mercury cup reservoirs 16 and 18. Upon the application of a pulse from the pulse circuit 28, current is applied along a short segment of the wire 10 lying between the mercury cup reservoirs 16 and 18. Upon application of the pulse from pulse circuit 28, the wire 10 severs within the orifice 22.

As illustrated in FIG. 2, the pulse circuit 28 can include a resistor 34 coupled across the brass contacts 30 and 32. One end of a capacitor 36 is coupled to the brass contact 30. A resistor 38, connected to a terminal 40 of positive voltage with respect to the common terminal 46, is coupled to the other end of the capacitor 36. A diode 42 and an inductor 44 are joined together in a shunting relationship, the anode of the diode 42 being coupled to the brass contact 32, and the cathode of the diode 42 being coupled to a common terminal 46, which common terminal 46 can be coupled to a point of reference potential, such as ground.

An SCR or silicon controlled rectifier 48 has its anode coupled to the common junction of the capacitor 36 and the resistor 38. The cathode of the rectifier 48 is coupled to the common terminal 46. The gate terminal of the SCR 48 is coupled to one end of a resistor 50, and to one end of a resistor 52. The other end of the resistor 50 is coupled to the common terminal 46. The other end of the resistor 52 is coupled to a gate terminal 54 to which a suitable pulse can be applied.

In operation, the capacitor 36 is charged from the voltage source +V through the terminal 40 and the resistor 38, and from the capacitor 36 through the resistor 34, the diode 42 (and the inductor 44), through the common terminal 46, to the point of reference potential, thus completing the electrical circuit. With the capacitor 36 in the charged condition, the silicon controlled rectifier 48 is nonconducting prior to the desired cutting time.

At the desired cutting time, a suitable trigger pulse is applied to the gate terminal 54, which is sufficient to fire the silicon controlled rectifier 48. Therefore, the capacitor 36 rapidly discharges through the silicon controlled rectifier 48, the inductor 44, through the contact 32, the segment of wire 10 between the two reservoirs 16 and 18, to the brass contact 30. The diode 42, during this interval, is nonconductive because it is back-biased.

The discharge current is limited only by the intrinsic resistance and inductance in the discharge path. The inductor 44 limits the rise time of the current. Most of the total loop resistance is in the segment of the wire between the mercury cups within the reservoirs 18 and 16, and, hence, nearly all the resistive heat generated in the loop is concentrated at that segment.

The temperature of the segment of wire 10 between the two reservoirs 16 and 18 rises rapidly to the melting point, thereby severing the wire and breaking the high current discharge path. The capacitor 36 continues to discharge through the resistor 34 until the current drops below the sustaining current threshold of the silicon controlled rectifier 48, at which time the silicon controlled rectifier 48 turns off and the capacitor 36 recharges through the resistor 38. After a time $T \cong 5R_1C$, to permit recharge of the capacitor, (where $R_1$ = the resistance of the resistor 38, and C=the capacitance of the capacitor 36), the cycle can be repeated.

By controlling the magnitude of the supply voltage +V, the energy stored in the capacitor 36 can be accurately controlled, and, hence, the peak discharge current can be controlled, thereby permitting a degree of control on the wire temperature so that the wire can be heated just above the melting point and thus effecting a clean break in the wire.

A clean break in the wire is highly desired, because, when the rate of temperature increases too quickly, the wire can melt explosively and create undesirable molten blobs on the wire ends.

Greater control of the circuit is achieved by controlling the current rise-time through the use of the series inductance 44 in shunt with the diode 42 to prevent arcing at the mercury contactors. This control mode offers an accurate determination of the rate of temperature rise and finer control of the physical appearance of the wire ends after cutting.

By way of illustration, and not the way of limitation, suitable parameters for the device as illustrated can be as follows:

The wire is moved at a rate of 9″ per minute.

| | | |
|---|---|---|
| Capacitor 36 | μf | 80 |
| Resistor 34 | ohms | 560 |
| Inductor 44 | μh | 10 |
| Resistance 50 | ohms | 100 |
| Resistance 52 | do | 10 |
| Resistor 38 | | 18K |
| Silicon controlled rectifier 48 | | Type C32D |
| Trigger pulse | volts | *3 |

* Positive with respect to the common terminal 46.

The segment of wire upon which the electrical pulse is applied is relatively short. In one particular embodiment, magnetically coated wire 10, having a diameter of 0.005″, has a pulse applied along a 0.125″ segment. The resistance $R_0$ (of the ⅛″ segment) = 4.322 milliohms at 20° C.

The resistance at the melting temperature $R_1$ is given by the following equation:

$R_1 = \alpha \Delta r R_0 = (.055)(1063)(4.32 \times 10^{-3}) = 2.3$ ohms at 1083° C. (max. melting temp.)

where $\alpha = 0.005$, and $\Delta r = 1{,}063°$ C.

The average value of $$R_{avg.} = \frac{R_1 + R_0}{2} = 1.15 \text{ ohms}$$

$H_T$. (the total heat required to reduce the mass of the segment to a molten state) = 0.0489 cal. = 0.2 joule. Hence, $H_t = I^2 R_{avg} t$. For $t = 10^{-5}$ seconds, $I = 174$ amperes.

The aforesaid calculations agree quite closely with observed cutting times and currents which range from $t$ being equal to 10 to 30 microseconds and I=150 to 200 amperes. Thus, the typical current waveform observed is a pulse of current which goes from 0 to 200 amperes and then back down toward 0 over a duration of 25 microseconds when the wire melts, with a long decay (such as 200 milliseconds) from approximately 240 milliamperes taking place through the resistor 34 across the cutting terminals.

The energy stored in the capacitor 36 at 200 volts is equal to $\frac{1}{2}CV^2 = 1.6$ joules, which yields, in this case, an efficiency of approximately 12½%.

The electronic wire cutter 12 can be made of various materials including epoxy and polytetrafloroethylene.

Referring to FIGS. 3 and 4, there is shown side and top cutaway sectional views of an electronic wire cutter 100 having guideway for receiving wire 10 therethrough. A pair of mercury wells or reservoirs 104, 106 are aligned along the path of the guideway 102. The mercury in each of the wells 104, 106 form a positive meniscus 108, 110 at the top of the respective well 104, 106.

A slight depression 112 couples the rear portion of the guideway 102 to the rear well 104. Similarly, a slight depression 114 couples the forward portion of the guideway 102 to the forward well 106. A slightly elevated conical contour 116 is given to the forward outlet of the guideway 102.

Brass contacts 30, 32 are coupled, respectively, to the mercury wells 104, 106. A high current pulser 28 is coupled across brass contacts 30, 32.

An air inlet 118 is located at the top of the wire cutter 100 and an outlet 116 is located at the side of the wire cutter 100. The inlet 118 and outlet 116 intersect within the wire cutter 100 at the guideway 102.

Adjustable screws 230 and 232, located at the side of the wire cutter 100, are coupled to the wells 104 and 106, respectively. A small vertical ridge 122 is located between the two wells 104, 106, the height of the ridge 122 being located below the top of the two menisci 108, 110.

In operation, the wire 10, when passing through the electronic wire cutter 100 along the guideway 102, contacts the mercury at the menisci 108, 110. A pulse of current provided by the high current pulser 28 to the brass contacts 30, 32 pass through the wire 10 between the two menisci 108, 110 and cause the wire 10 to sever. The wire 10, when passing through the mercury at each of the menisci 108, 110, may tend to wet, causing droplets of mercury to be dispersed outside of the wells 104, 106. These droplets of mercury when dropped upon the depressions 112, 114 roll into the respective wells 104, 106.

Due to the slightly raised conical contour 116 of the guideway 102 outlet, the wire 10 is guided through the wire cutter 100 without hindrance.

Air passes through the inlet 118 and out of the outlet 120, dissipating mercury vapor which may occur, and eliminating undesired air pressure due to heat which might tend to hinder the free passage of wire 10.

The passage of wire 10 through the electronic wire cutter 100 and the periodic operation of the pulser 28 causes mercury in the respective wells 104, 106 to dissipate. Therefore, in order to keep the height of each of the menisci 108 and 110 at a desired level the individual screws 230, 232 are adjustable.

Various modifications and embodiments will present themselves to one ordinarily skilled in the art.

For example, a plurality of stages can be coupled in side-by-side relationship, utilizing various common components.

It is desired that the inventive concept of this invention be construed broadly and that it be limited solely by the scope of the allowed claims.

The embodiments of the invention in which an exclusive property or privilege is claimed are defined as follows:

1. A device for severing wire comprising a member having a contoured guideway therethrough for the passage of wire, said member having a first reservoir and a second reservoir coupled along said guideway wherein each of said reservoirs is adapted to contain liquid mercury, said member having an orifice between said reservoirs intersecting at said guideway; means for passing air through said orifice; a first electrical contact coupled to the mercury in said first reservoir; a second electrical contact coupled to the mercury in said second reservoir; and means for applying an electrical charge across said contacts including a capacitor, means for charging said capacitor, inductor means coupling said capacitor to said contacts, and means for discharging said capacitor through said inductor means.

2. A device for severing wire comprising a member having a contoured guideway therethrough for the passage of wire, said member having a first reservoir and a second reservoir coupled along said guideway, each of said reservoirs containing liquid mercury, said member having an orifice between said reservoirs intersecting at said guideway; means for passing air through said orifice; a first electrical contact coupled to said mercury in said first reservoir; a second electrical contact coupled to said mercury in said second reservoir; means for receiving a voltage source; means for coupling to a point of reference potential; a capacitor having one end coupled to said first contact; a charging resistor coupling said receiving means to the other end of said capacitor; a discharging resistor coupled across said contacts; a diode and inductor coupled to form a shunt circuit, said circuit being coupled between second contact and said point of reference potential coupling means; and a silicon controlled rectifier having one electrode coupled to said other end of said capacitor, a second electrode coupled to said point of reference potential receiving means, and a control electrode coupled to receive a control signal.

3. A device for severing wire comprising a member having a guideway therethrough for the passage of wire, said member having a first reservoir and a second reservoir coupled along said guideway, each of said reservoirs containing liquid mercury; a first electrical contact coupled to said mercury in said first reservoir; a second electrical contact coupled to said mercury in said second reservoir; means for receiving a voltage source; means for coupling to a point of reference potential; a capacitor having one end coupled to said first contact; a charging resistor coupling said receiving means to the other end of said capacitor; a discharging resistor coupled across said contacts; a diode and inductor coupled to form a shunt circuit, said circuit being coupled between said second contact and said point of reference potential coupling means; and a silicon controlled rectifier having one electrode coupled to said other end of said capacitor, a second electrode coupled to said point of reference potential receiving means, and a control electrode coupled to receive a control signal.

References Cited
UNITED STATES PATENTS

| | | | |
|---|---|---|---|
| 1,118,418 | 11/1914 | Henderson | 219—155 X |
| 1,319,085 | 10/1919 | Jacobson | 219—155 X |
| 2,421,537 | 6/1947 | Boyers | 219—155 X |
| 2,606,266 | 8/1952 | Duch et al. | 219—68 |
| 2,706,231 | 4/1955 | Tyler et al. | 219—68 |
| 3,211,885 | 10/1965 | Fischer | 219—113 |
| 3,351,740 | 11/1967 | Heuer. | |

RICHARD M. WOOD, *Primary Examiner.*

R. F. STAUBLY, *Assistant Examiner.*

U.S. Cl. X.R.

219—113